(12) United States Patent
Farthofer et al.

(10) Patent No.: US 9,241,256 B2
(45) Date of Patent: Jan. 19, 2016

(54) TRANSMISSION AND DISTRIBUTION OF POSITION- AND/OR NETWORK-RELATED INFORMATION FROM ACCESS NETWORKS

(75) Inventors: Martin Farthofer, Vienna (AT); Georg Kastelewicz, Berlin (DE); Gerhard Kieselmann, München (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 947 days.

(21) Appl. No.: 12/595,974

(22) PCT Filed: Apr. 10, 2008

(86) PCT No.: PCT/EP2008/054356
§ 371 (c)(1),
(2), (4) Date: Nov. 12, 2009

(87) PCT Pub. No.: WO2008/128905
PCT Pub. Date: Oct. 30, 2008

(65) Prior Publication Data
US 2010/0130227 A1    May 27, 2010

(30) Foreign Application Priority Data
Apr. 19, 2007   (EP) .................................... 07008016

(51) Int. Cl.
*H04W 64/00* (2009.01)
*H04W 8/10* (2009.01)
*H04W 4/02* (2009.01)

(52) U.S. Cl.
CPC .. *H04W 8/10* (2013.01); *H04W 4/02* (2013.01)

(58) Field of Classification Search
CPC ....... H04W 4/02; H04W 84/12; H04W 84/18; H04W 28/10; H04W 12/04; H04W 12/06; H04W 12/08; H04L 12/1407; H04L 63/0853

USPC ........ 455/457, 560, 456.1; 370/338, 828, 325
See application file for complete search history.

(56) References Cited

U.S. PATENT DOCUMENTS

| 7,200,401 B1 * | 4/2007 | Hulkkonen et al. .......... 455/438 |
| 2006/0105810 A1 * | 5/2006 | Gnuschke ..................... 455/558 |

(Continued)

FOREIGN PATENT DOCUMENTS

EP   1715625   10/2006

OTHER PUBLICATIONS

Sophia-Antipo, "Digital Cellular Telecommunications System (Phase 2+)", ETSI Standards, European Telecommunications Standards Institute, vol. 3, No. V730, Sep. 2006.

(Continued)

*Primary Examiner* — Phuoc H Doan
(74) *Attorney, Agent, or Firm* — Squire Patton Boggs (US) LLP

(57) ABSTRACT

The present invention relates to a method, subscriber database, network element, an interface, and a computer program product for distributing position- or network-related information from an access network to a core network, wherein a first interface between the access network and the subscriber database is associated with a second interface between the core network and the subscriber database in a manner so that, in response to at least one predetermined notification indicating a registration or change of position and signaled to the subscriber database via the first interface, the position- or network-related information is selectively signaled via the second interface to a network element of the core network in a server assignment answer or in a push profile request. Thereby, position or location information of a subscriber or user in an access network is directly or automatically availability in the core network.

35 Claims, 12 Drawing Sheets

(56) References Cited

U.S. PATENT DOCUMENTS

| | | | |
|---|---|---|---|
| 2006/0172773 A1* | 8/2006 | Morishita et al. | 455/560 |
| 2007/0067470 A1 | 3/2007 | Ayers | |
| 2007/0259646 A1* | 11/2007 | Hu et al. | 455/406 |
| 2009/0286540 A1* | 11/2009 | Huber et al. | 455/435.1 |

OTHER PUBLICATIONS

"3GPP" 3rd Generation Partnership Project, Technical Specification Group Services and Systems Aspects, IP Multimedia Subsystem (IMS), 3rd Generation Partnership Project (3GPP); Technical Specification (TS), Jun. 2004.

3GPP TS 24.229 V7.7.0 (Mar. 2007) 3rd Generation Partnership Project; Technical Specification Group Core Network and Terminals; IP multimedia call control protocol based on Session Initiation Protocol (SIP) and Session Description Protocol (SDP); Stage 3 (Release 7).

3GPP TS 23.060 V7.4.0 (Mar. 2007) 3rd Generation Partnership Project; Technical Specification Group Services and System Aspects; General Packet Radio Service (GPRS); Service description; Stage 2 (Release 7).

3GPP TS 23.002 V7.1.0 (Mar. 2006) 3rd Generation Partnership Project;Technical Specification Group Services and Systems Aspects; Network architecture (Release 7).

3GPP TS 29.006 V3.0.0 (May 1999) 3rd Generation Partnership Project; Technical Specification Group Core Network;Interworking between the Public Land Mobile Network (PLMN) and a Packet Switched Public Data Network/Integrated Services Digital Network (PSPDN/ISDN) for the support of packet switched data transmission services (3G TS 29.006 version 3.0.0).

3GPP TS 29.228 V7.5.0 (Mar. 2007) 3rd Generation Partnership Project; Technical Specification Group Core Network and Terminals; IP Multimedia (IM) Subsystem Cx and Dx interfaces; Signalling flows and message contents (Release 7).

3GPP TS 23.228 V7.7.0 (Mar. 2007) Technical Specification 3rd Generation Partnership Project; Technical Specification Group Services and System Aspects; IP Multimedia Subsystem (IMS); Stage 2 (Release 7).

3GPP TS 33.107 V7.5.0 (Mar. 2007) Technical Specification 3rd Generation Partnership Project; Technical Specification Group Services and System Aspects; 3G security; Lawful interception architecture and functions (Release 7).

3GPP TS 33.108 V7.7.0 (Mar. 2007) Technical Specification 3rd Generation Partnership Project; Technical Specification Group Services and System Aspects; 3G security; Handover interface for Lawful Interception (LI) (Release 7).

Network Working Group D. Mills et al RFC 4330 Simple Network Time Protocol (SNTP) Version 4 for IPv4, IPv6 and OSI Jan. 2006.

Network Working Group A. B. Roach et al RFC 3265 Session Initiation Protocol (SIP)-Specific Event Notification Jun. 2002.

Network Working Grou J.Rosenberg et al RFC 3261 SIP: Session Initiation Protocol Jun. 2002.

* cited by examiner

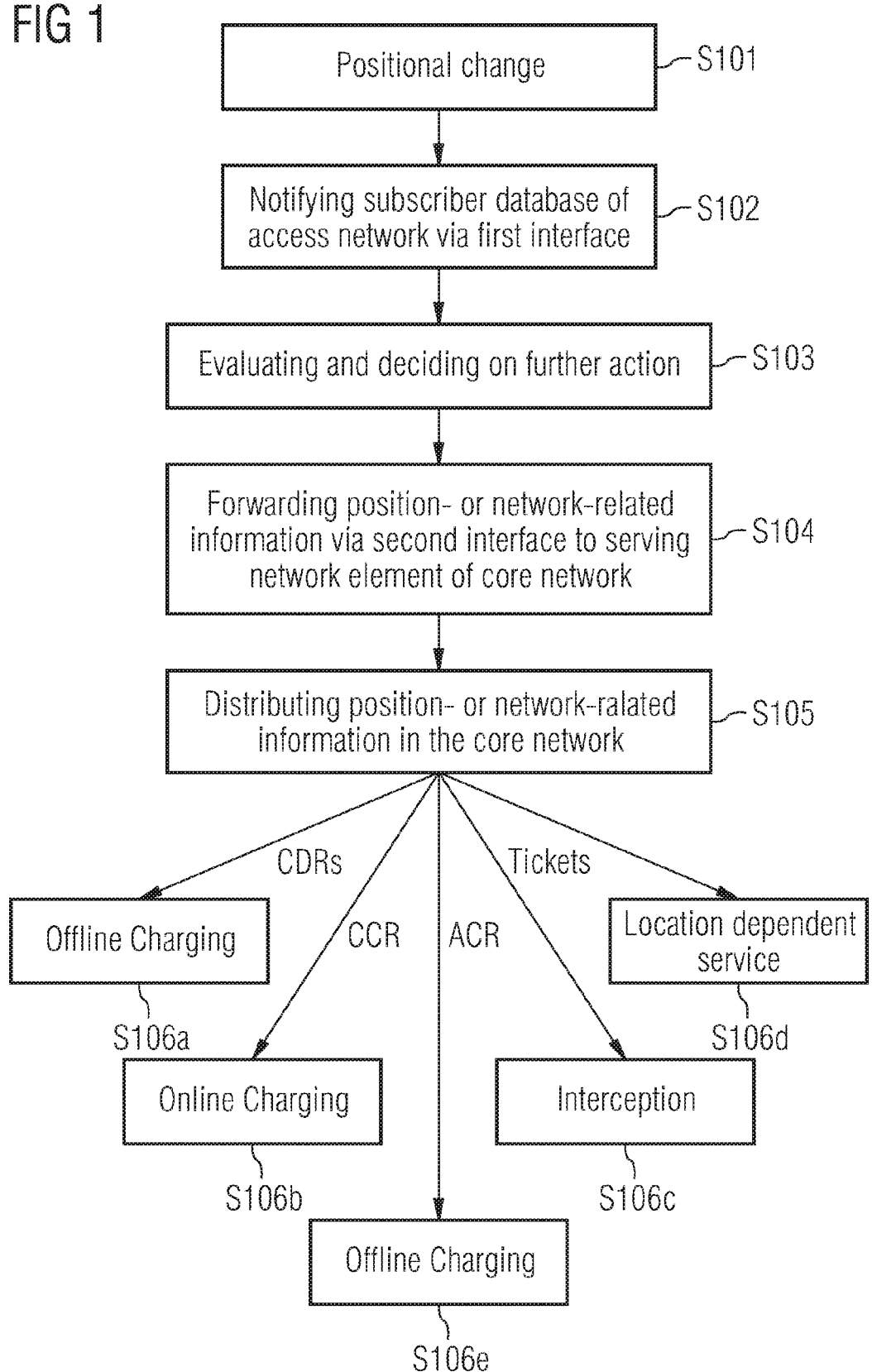

FIG 2

| Position information | Denotation |
|---|---|
| Identification of the network in which the subscriber is subscribed | Mobile Country Code/Mobile Network Code (MCC/MNC) |
| IP adress of the SGSN which is allocated to the subscriber | SGSN-ID |
| Access technology which the subscriber uses, e.g. either GPRS or UMTS | Radio Access Type (RAT-Type) |
| Location Information | Cell Global Identification (CGI) as well as Service Area Identity (SAI) or CGI/LAI, respectively |

FIG 3

| Position Information | Taken from the HSS out of the Gi interface AVP | Sent from HSS via the Cx-SAA interface AVP |
|---|---|---|
| SGSN IP Address | 3GPP-SGSN-Address/ 3GPP-SGSN-IPv6-Address | 3GPP-SGSN-Address |
| SGSN MCC MNC | 3GPP-SGSN-MCC-MNC | 3GPP-SGSN-MCC-MNC |
| Radio Access Technology | 3GPP-RAT-Type | 3GPP-RAT-Type |
| GPRS/UMTS Location Information (includes the CGI/LAI) | 3GPP-User-Location-Info | 3GPP-GPRS-UMTS-Location-Information |

FIG 4

| # | Handover types according to TS 23.060 | Details |
|---|---|---|
| 1 | GPRS Routing Area Update (A/Gb mode) | Intra SGSN Change |
|   |   | Inter SGSN Change |
| 2 | UMTS Routing Area Update (Iu mode) | Intra SGSN Change |
|   |   | Inter SGSN Change |
| 3 | Serving RNS/RNC Relocation (UMTS-Iu mode) | RNC Change/Inter SGSN Change |
| 4 | Inter-system Change | Intra SGSN Change (GPRS→UMTS or UMTS→GPRS) |
|   |   | Inter SGSN Change (GPRS→UMTS or UMTS→GPRS) |

FIG 5

| Change of position information | Action to be performed by the HSS in dependence on the access network in which the subscriber is subscribed: ||
| --- | --- | --- |
| | Access network belongs to the same operator as the IMS | Access network does not belong to the same operator as the IMS |
| Change of information element 1 | Send / don't send | Send / don't send |
| Change of information element 2 | Send / don't send | Send / don't send |
| ... | Send / don't send | Send / don't send |
| Change of information element N | Send / don't send | Send / don't send |

FIG 6

| Change of position information | Action to be performed by the HSS in dependence on the access network in which the subscriber is subscribed: ||
| --- | --- | --- |
| | Access network belongs to the same operator as the IMS | Access network does not belog to the same operator as the IMS |
| Change of access network: MCC/MNC change | Level 1: don't send, Level 2: send, Level 3: send | Level 1: don't send, Level 2: send, Level 3: send |
| Change of access node: SGSN IP address change | Level 1: don't send, Level 2: send, Level 3: send | Level 1: don't send, Level 2: send, Level 3: send |
| Change of access technology: RAT type change | Level 1: don't send, Level 2: don't send, Level 3: send | Level 1: don't send, Level 2: send, Level 3: send |
| Change of location: CGI/SAI change | Level 1: don't send, Level 2: don't send, Level 3: send | Level 1: don't send, Level 2: don't send, Level 3: send |

FIG 7

| Position information | RADIUS interface (attribute) | Cx Interface (AVP) |
|---|---|---|
| SGSN IP Address | 3GPP-SGSN-Address/ 3GPP-SGSN-IPv6-Address | 3GPP-SGSN-Address |
| SGSN MCC MNC | 3GPP-SGSN-MCC-MNC | 3GPP-SGSN-MCC-MNC |
| Radio Access Technology | 3GPP-RAT-Type | 3GPP-RAT-Type |
| GPRS/UMTS Location Information | 3GPP-User-Location-Info | 3GPP-GPRS-UMTS-Location-Information |
| Time Stamp | n/a | Location-Change-Time-Stamp |

FIG 10

| Data | Cx Interface (AVP) | SIP P-header |
|---|---|---|
| SGSN IP Address | 3GPP-SGSN-Address | P-com.Sgsn-ID |
| SGSN MCC MNC | 3GPP-SGSN-MCC-MNC | P-com.MNCMCC |
| Radio Access Technology | 3GPP-RAT-Type | P-com.RATType |
| GPRS/UMTS Location Information | 3GPP-GPRS-UMTS-Location-Information | P-com.LocationInfo |
| Time Stamp | Location-Change-Time-Stamp | P-com.LocationChangeTimeStamp |
| SIP Call ID | n/a | P-com.Call-ID |

FIG 11

| Record Extension | | |
|---|---|---|
| | List of Location Information | |
| | | SGSN IP Address (3GPP-SGSN-Address AVP) |
| | SGSN IP Address | MCC and MNC of the SGSN (3GPP-SGSN-MCC-MNC AVP) |
| | SGSN MCC MNC | Radio Access Technology Type (3GPP-RAT-Type AVP) |
| | Radio Access Technology | CGI or SAI in which the UE is located (3GPP-GPRS-UMTS-Location-Information AVP) |
| | Location Information | Either Time Stamp received from the HSS in the Cx: PPR message (Location-Change-Time-Stamp AVP) or Time Stamp when the SIP session is started (Service-Delivery-Start-Time-Stamp) |
| | Time Stamp | |

FIG 12

| Data | Cx Interface (AVP) | PS-Information-AVP |
|---|---|---|
| SGSN IP Address | 3GPP-SGSN-Address | [SGSN-Address] |
| SGSN MCC MNC | 3GPP-SGSN-MCC-MNC | [3GPP-SGSN-MCC-MNC] |
| Radio Access Technology | 3GPP-RAT-Type | [3GPP-RAT-Type] |
| GPRS/UMTS Location Information | 3GPP-GPRS-UMTS-Location-Information | [3GPP-User-Location-Info] |
| Time Stamp | Location-Change-Time-Stamp | n/a |

| Record Extension | | |
|---|---|---|
| | List of Location Information | |
| | SGSN IP Address | "158.226.7.254" |
| | SGSN MCC MNC | "232 03" |
| | Radio Access Technology | "2 (GERAN)" |
| | Location Information | "CGI=232 03 LAC CI" |
| | Time Stamp | "200 OK (answering SIP INVITE)" |
| | SGSN IP Address | "147.54.17.238" |
| | SGSN MCC MNC | "232 01" |
| | Radio Access Technology | "2 (GERAN)" |
| | Location Inforamtion | "CGI=232 01 LAC CI" |
| | Time Stamp | "ACR interim-update" |

TRANSMISSION AND DISTRIBUTION OF POSITION- AND/OR NETWORK-RELATED INFORMATION FROM ACCESS NETWORKS

FIELD OF THE INVENTION

The present invention relates to a relates to a method, subscriber database, network element, an interface and computer program product for distributing position- or network-related information from an access network to a core network.

BACKGROUND OF THE INVENTION

Third Generation Partnership Project (3GPP) standards for mobile communication define applications for various interfaces in the Internet Protocol (IP) Multimedia Subsystem (IMS) network. In the IMS reference architecture, the home subscriber server (HSS) comprises a subscriber database which holds all information about subscribers and their subscriptions. Access to any information regarding this profile needs to be queried from the HSS such as the location, authorization for conferencing, etc. Required messages are defined in terms of a command set identified by various reference points, such as Cx/Dx, Sh, Rf/Ro, Gq, Wx, Bi. Hence, on subscriber related interfaces, such as Cx and Sh, requests to access and update a subscriber profile are transferred. A base protocol defines the basic Diameter message format. Data is carried within a Diameter message as a collection of Attribute Value Pairs (AVP). An AVP consists of multiple fields: an AVP Code, a Length, Flags, and Data. Some AVPs are used by the Diameter base protocol itself—other AVPs are intended for Diameter applications.

Access to the IMS network or other types of core networks is possible by using a wide range of access technologies. Mobile access via the General Packet Radio Services (GPRS) or Universal Mobile Telecommunications System (UMTS) plays an important role as such an access technology. Knowledge about the position, location, or access technology and monitoring of movement profiles of mobile subscribers is important for network operators of the IMS or other core networks to provide for example charging services, lawful interception, and other services depending on the position or location of the subscriber, or the type of access network.

More specifically, knowledge about the position of a subscriber and his or her positional change (i.e., roaming) allows charging of a use of IMS services independent from the actual position or location of the subscriber or user, as is usual in fixed networks. In big countries this information is interesting for network operators, to differentiate charging of local calls and far-distance calls. For lawful interception usefulness of this information is also apparent. The same applies to location dependent services, such as traffic congestion information, advertisement or transmission of location information to friends and family, as e.g. kid tracking services.

However, a problem resides in that, so far, direct transmission of position-related or network-related information and its change from the access network to those nodes in the IMS or core network which are responsible for charging, interception and other related services was not standardized or automated.

SUMMARY

It is therefore an object of the present invention to provide a method and system for directly or automatically distributing position- or network-related information from an access network to a core network.

This object is achieved by a method of distributing position- or network-related information from an access network to a core network, wherein a first interface between said access network and a subscriber database is associated with a second interface between said core network and said subscriber database in a manner so that, in response to at least one predetermined notification which indicates a registration or change of position and which is signaled to said subscriber data base via said first interface, said position- or network-related information is selectively signaled via said second interface to a network element of said core network in a server assignment answer or in a push profile request.

Additionally, the above object is achieved by a subscriber database for storing subscriber-related data of an access network, said network device comprising a first interface to said access network and a second interface to a core network, wherein said subscriber database is arranged to selectively signal position or network-related information via said second interface to a network element of said core network in a server assignment answer or in a push profile request, in response to a receipt of a predetermined notification indicating a registration or change of position via said interface.

Furthermore, the above object is achieved by a network element which is configured to serve subscribers in a core network and having an interface connecting to a subscriber database of an access network, said network element being arranged to receive position- or network-related information via said interface in a server assignment answer or in a push profile request, and to distribute said received position- or network-related information in or from said core network.

Moreover, the above object is achieved by a network system comprising a subscriber database and a network element as specified above.

It is noted that the above method could be implemented as a computer program product comprising code means for producing the above method steps when run on a computing device.

Accordingly, the position- or network-related information received from the access network is directly or automatically forwarded to a network element in the core network and can be directly used for services which can make use of such information. Access network and core network interfaces are enhanced to be related to each other in a manner that the position- or network-related information, such as roaming information, is transmitted to the network element of the core network and from there distributed in the core network, when a corresponding notification has been received.

In predetermined embodiments, the position- or network-related information may comprise at least one of an identification of the access network, a network address of serving node of a concerned subscriber in the access network, an access technology used by the concerned subscriber in the access network, and a location information of a terminal device used by the concerned subscriber. According to a particular example, the identification of the access network may be signaled by at least one of a mobile country code and a mobile network code, wherein said access technology may be signaled by a radio access type parameter, and the location information may be signaled by at least one of a cell global identification and a service area identity.

In the embodiments, the access network may be a cellular network and the core network may be a multimedia subsystem. However, it is noted that the present invention is not restricted to these specific kinds of access and core networks. Rather, the present invention can be applied to any type or kind of access or core network, where position- or network-related information is required at the core network for service provision or other subscriber services.

Furthermore, the subscriber database may be a home subscriber server (HSS) or any other kind of subscriber database, such as a home location register (HLR).

In a specific implementation, the access network may be a network of the General Packet Radio Services (GPRS) type or the Universal Mobile Communications System (UMTS) type, wherein the first interface may be a Gi reference point and the second interface may be Cx interface. Then, the push profile request may be Push-Profile-Request Message and the server assignment answer may be a Server-Assignment-Answer message.

The position- or network-related information may be signaled as an attribute value pair (AVP), such as an AVP of the Diameter protocol.

The position- or network-related information by the network element in the core network may be added to at least one of a charging data record, a credit control request, an account request, or an interception ticket.

Furthermore, the predetermined notification may comprise at least one of an accounting request, an accounting request update, and an update context request.

In an embodiment, the predetermined notification may be evaluated and a predetermined further action may be selected at the subscriber database. As a more specific example, the evaluation may be based on a comparison with a stored previous value of the position- or network-related information, and on a determination whether or not the access network belongs to the same operator as the core network, if the value of the position- or network-related information has changed. As an additional option, the selection may be based on a hierarchical structure comprising at least two of a first level in which the position- or network-related information is not signaled to the network element, a second level in which the position- or network-related information is signaled to the element if the access network has changed or if the concerned subscriber is registered in a network which does not belong to the operator or the core network, and a third level in which said position- or network-related information is always signaled to the network element.

As a further option, a time information indicating the time of receipt of the predetermined notification can be signaled to the network element together with the position- or network-related information.

In an embodiment, the position- or network-related information may be added at the network element to a request for registering a third party and sent to at least one application server configured in a user profile and connected to said core network, if the predetermined notification indicates a user registration.

As an alternative or additional option, if a user to which the predetermined notification relates transmits or receives a message to/from the core network, the position- or network-related information can be added to the message at the network element. In this case, the added position- or network-related information may be deleted when a message leaves a predetermined reliable network domain.

Furthermore, if a user to which the predetermined notification relates is involved in at least one dialogue, the position- or network-related information and an identification of the dialogue may be added at the network element to a message and sent to at least a selection of network elements located on a path of the dialogue. As an example, this selection may be determined from at least one of route set of said dialogue, an event package to which interested network elements are subscribed, and a pre-configuration. Also in this case, a time stamp may be added to the message.

Further advantageous modifications or developments are defined in the dependent claims.

BRIEF DESCRIPTION OF THE DRAWINGS

The present invention will now be described on the basis of embodiments with reference to the accompanying drawings in which:

FIG. 1 shows a schematic flow diagram of a transmission or distribution method according to an embodiment;

FIG. 2 shows a table indicating position information and their respective denotation, which may be used in a preferred embodiment;

FIG. 3 shows a table indicating position information and respective types of forwarding from the access network to the core network in an embodiment;

FIG. 4 shows a table indicating handover types and corresponding details;

FIG. 5 shows a table indicating actions to be performed by a subscriber database in dependence on change specific information elements of the position information;

FIG. 6 shows a table with specific information elements and a hierarchical structure of actions;

FIG. 7 shows a table indicating position information and corresponding attributes set at respective interfaces of the access network and the core network;

FIG. 10 shows a table indicating roaming information and other data of respective interfaces of the access network and the core network;

FIG. 11 shows a table indicating an enhancement of a record extension field in charging data records according to an embodiment;

FIG. 12 shows a table indicating an enhancement of attribute value pairs for online charging according to an embodiment;

DESCRIPTION OF THE EMBODIMENT

Figure 8:
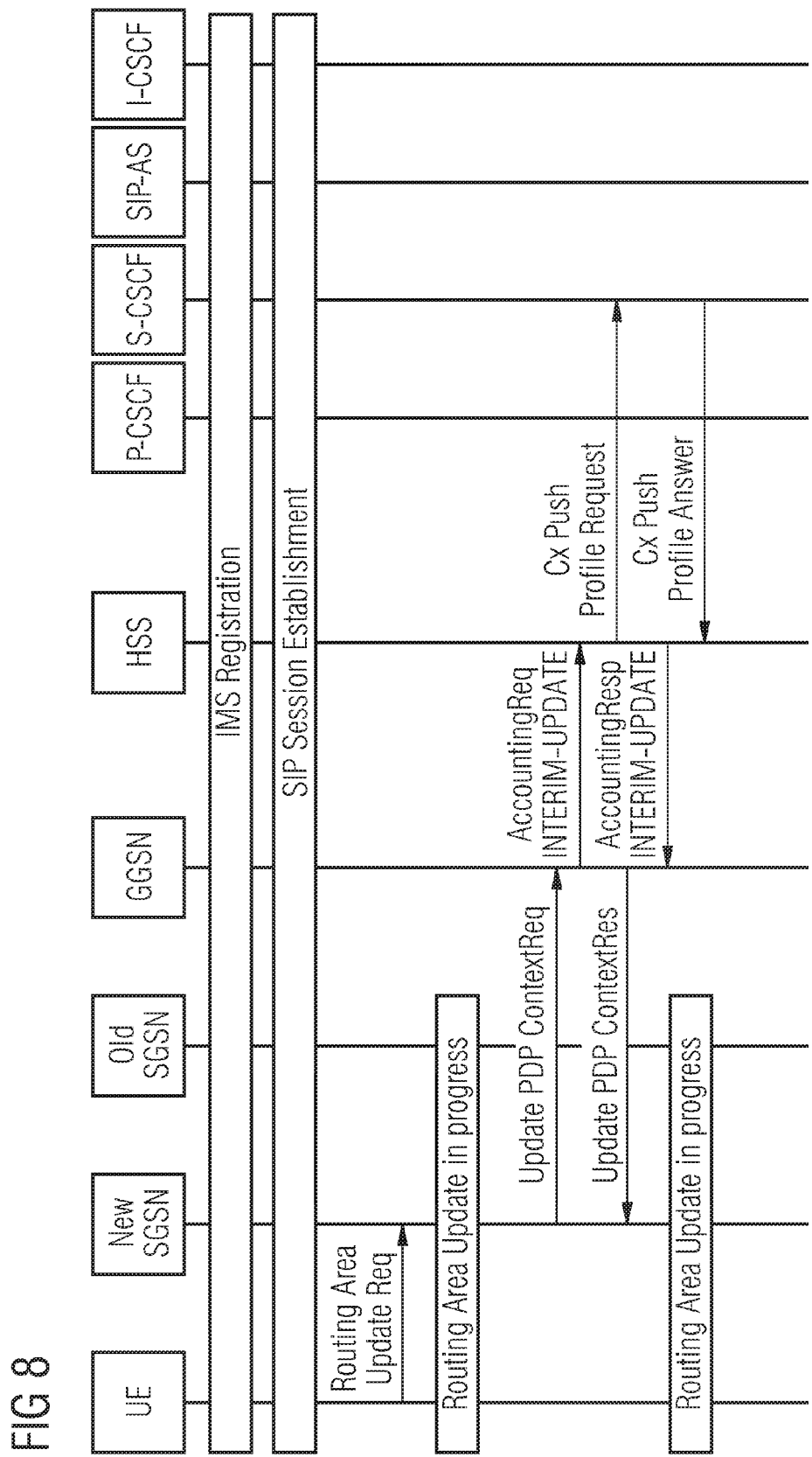
FIG. 8 shows a schematic signaling and processing diagram of a routing area update procedure according to an embodiment.

Preferred embodiments of the present invention will now be described based on a network environment in which an IMS network is connected to a GPRS/UMTS access network. According to the embodiments, a position- or network-related information from the access networks and/or its change is transmitted or transferred to the IMS network to be used by predetermined network notes, e.g., for at least one of charging, interception and location dependent services.

FIG. 1 shows a schematic flow diagram of the basic steps involved in the proposed transmission or transfer scheme from the access network to the core network, e.g. IMS network. When a positional change or a registration of a concerned subscriber is detected in step S101, the subscriber database, e.g. HSS, of the access network is notified via a first interface connecting the subscriber database to the access network (step S102). At the subscriber database, the notification with the corresponding information about the positional change or registration is evaluated and a decision on further action is made (step S103). Based on this decision, the position- or network-related information is selectively forwarded via a second interface to a serving network element of the core network (step S104). This serving network element is then arranged to distribute the position- or network-related information in a core network (step S105). The distributed position- or network-related information can be used for various types of services, which is indicated by steps S106a to S106d which can be performed in parallel, individually, or in any kind of combination based on the activated or subscribed services of the concerned subscriber.

As a first option, the position- or network-related information may be added to charging data records (CDRs) used for offline charging at a corresponding or allocated network element of the core network (step S106a).

As a second option, the distributed position- or network-related information may be added to an ACR Initial or Update used for offline charging via corresponding network nodes (step S106e).

As a third option, the distributed position- or network-related information may be added to a CCR Initial or Update used for online charging via corresponding network nodes (step S106b).

As fourth option, the distributed position- or network-related information may be added to tickets used for interception at corresponding network nodes (step S106c).

Finally, as a fifth option, the distributed position- or network-related information may be distributed to and used by various locations dependent services at corresponding allocated network nodes (step S106d).

As already indicated above, the procedure of FIG. 1 may end after step S103 if the evaluation and decision leads to the result that the position- or network-related information is not distributed in the core network.

FIG. 2 shows a table indicating exemplary position information of the GPRS/UMTS access network, which comprises an identification of the network in which the subscriber is subscribed, such as a mobile country code (MCC) or a mobile network code (MNC). As another option, an IP address of the Serving Gateway Support Node (SGSN) which is allocated to the concerned subscriber may be used. As an additional option, a radio access type information (RAT-type) defines an access technology which the subscriber uses, for example either GPRS or UMTS. As a further option, an allocation information such as a cell global identification (CGI) which may be combined with a service area identity (SAI) or a location area identity (LAI).

This information may as well be time-dependent, so that a change of the access network, the serving network element (e.g. SGSN) of the access network, or the access technology may also be of interest. Of course, other access networks have other corresponding position information as those indicated in the table of FIG. 2. An example of such other access networks is a WLAN (Wireless Local Area Network) hotspot. Relevant IMS network nodes to which the position or network related information may be transferred or transmitted, may be a serving call session control function (S-CSCF) and/or SIP (Session Initiation Protocol) application servers. Other options are a proxy-CSCF (P-CSCF), an interrogating-CSCF (I-CSCF), a MGCF (Media Gateway Control Function) and/or a BGCF (Border Gateway Control Function).

In the following, it will be assumed that the current position information is known to the HSS. The HSS may obtain this information in several ways, for example via a RADIUS Accounting Request START message, which is transmitted from an element of the access network (for example the Gateway GPRS Support node (GGSN) in case of a GPRS/UMTS access network) to an authentication authorization and accounting (AAA) server, which is either integrated on the HSS or connected to the HSS via a suitable interface, so that received AAA messages are known to the HSS.

In the following, the procedure of FIG. 1 is described in more detail. When a subscriber is connected to the access network, the current position is signaled to the HSS from an element of the access network, using for example a RADIUS Account Request START Message or any other message used for signaling a position of a user or terminal to the subscriber database in the access network. The HSS stores this data in a subscriber specific manner. If the terminal device of the subscriber then initializes SIP registration to the IMS core network (for example according to the 3rd Generation Partnership Project (3GPP) specifications TS23.228, TS24.229 and/or TS29.228), the position information is transmitted in the course of the registration procedure via e.g. the Cx interface to the serving network element in the core network, e.g., the S-CSCF, by using a server-related message, such as for example the Server Assignment Answer (SAA) of the Cx protocol. To achieve this, the message may be enhanced by at least one attribute value pair (AVP), which contains the position information. Such an enhancement of the Cx interface leads to at least one specific AVP which still can be in conformity with the standard. For some access networks, such as GPRS or UMTS, the AVP may as well be specified by an enhancement of the standard itself.

Accordingly, as a specific but non-limiting example, the Cx-SAA-message according to the specification TS29.229 can be enhanced by at least one AVP which contains position- or network-related information. The exact content of this information may depend on the kind of access network (for example GPRS/UMTS or WLAN), and thus also the respective AVP(s).

A further aspect of the embodiment is that the position- or network-related information which is distributed in the IMS to the serving network node and optionally to other network nodes, e.g., upon SIP registration, could be written or added to a CDR, online charging messages or interception tickets, respectively, or could be used by other applications which require it. Accordingly, CDRs, offline charging messages, online charging messages, interception tickets can be enhanced by position- or network-related information in cases of registration, roaming or other positional changes of a subscriber.

FIG. 3 shows a table which indicates for the specific example of a GPRS/UMTS access network how the position information of the table of FIG. 2 can be transferred via e.g. a Gi interface according to the 3GPP specifications TS23.002 and/or TS29.006 as an AVP in RADIUS Accounting Request Start message to the HSS (second column of the table of FIG. 3). Each AVP of the second column of this table is assigned or allocated to a new AVP in the Cx-SAA message (third column of the table of FIG. 3). Thereby, the roaming or positional information is mapped onto the Gi interface and the Cx interface.

If a subscriber changes his/her position in relation to the positional data known to the access network, this may be accompanied by different handover scenarios. In the example of the GPRS/UMTS access network, possible change options are shown in the table of FIG. 4, where an inter-SGSN-change can include a change of the network.

As indicated in step S102 of FIG. 1, the subscriber database (e.g. HSS) is notified about such positional change. In particular, the access network may inform the HSS about the positional change of the subscriber in the following exemplary manner related to the GPRS/UMTS access network. The SGSN informs the GGSN about the change. Then, the GGSN informs the HSS about the change. In this regard, two different actions can be distinguished: (i) The terminal device (or user equipment (UE) in 3G terminology) triggers a routing area update (RAU) procedure according to the 3GPP specification TS23.060. During this RAU procedure, the SGSN informs the GGSN about the change of the SGSN. (ii) On the other hand, in case of a relocation, the source radio network controller (S-RNC) triggers a relocation procedure according to the 3GPP specification TS23.060. During a Serving Radio Network Subsystem (RNS) relocation procedure, the SGSN informs the GGSN about the relocation. The communication between the SGSN and the GGSN may be performed by using an update packet data protocol (PDP) context request message, while the communication between the GGSN and the HSS may be achieved by using an accounting request interim update message. Hereby, the new position- or network-related information is transferred, wherein the AVP(s) of the message are shown in the second column of the table of FIG. 3.

In the present embodiment, the GGSN is configured to send an accounting request interim update to the HSS when a change of the SGSN (inter-SGSN-change) occurs. Furthermore, the SGSN is configured to send an update PDP context request to the GGSN when a change within the SGSN (intra-SGSN-change) occurs. Additionally, in case of a change of the access technology (e.g. GPRS to UMTS or UMTS to GPRS) the SGSN sends an update PDP context request to the GGSN. In case of such an intra- or inter-SGSN handover, the GGSN sends an accounting request interim update to the HSS.

In the following, the evaluation and deciding step S103 of FIG. 1 is described in more detail based on the present embodiment. The HSS receives a roaming information (i.e. an information about a change of position of the subscriber) via a suitable interface of the access network, as described above for the example of a GPRS/UMTS access network. Now, the HSS evaluates this information and decides whether this information must be forwarded to a predetermined IMS network node or whether this is not required at all. For this decision, a decision logic may be implemented on the HSS. In a general example, this may be a matrix which comprises an array of fields containing information as to whether the HSS shall forward the position- or network-related information via the Cx interface to the S-CSCF or not, in case of a change of the position- or network-related information.

For this decision, the HSS may as well use an information about the question whether the subscriber is registered in an own or a foreign access network (i.e. whether the access network belongs to the same operator as the IMS or not).

FIG. 5 shows a table indicating such a decision logic which defines an action to be performed by the HSS in dependence on the change of specific information elements. Or, more specifically, for each specific information element 1 to N, it is defined whether the position- or network-related information is to be sent or not, in dependence on the question whether the access network belongs to the same operator. For example, in case of a change of the position, the HSS may apply the following procedure for each information element of the table of FIG. 5, for which in at least one column a parameter "send" is set. First it is checked whether the value of this information element has changed in comparison to the start value. If not, the next information element is checked. Otherwise, the new value is stored at the HSS. Then, it is checked whether the subscriber was located in the own or foreign network prior or after the change. Depending on the entry "send" or "not send" in the corresponding column, the value of the changed information element is transmitted to the S-CSCF in step S104 of FIG. 1, or not.

Referring again to the example of the GPRS/UMTS access network, the following hierarchical structure with three levels could be used for the decision logic. In a first level, the position- or network-related information (e.g. roaming information) is not forwarded to the network node of the core network. In a second level, the network- or position-related information is forwarded if the access network has changed (e.g. the subscriber was first registered by a first operator and then by a second operator), i.e. inter-PLMN-handover, as well as if the subscriber is registered in a network which does not belong to the IMS operator and changes the access technology within this network (this makes sense for example if the roaming fees in a foreign network are different for GPRS and UMTS, while they are equal in the own network). Finally, in the third level, all position- or network-related information is forwarded in any case, i.e. change of the access network, change of the access technology, change of the SGSN, change of the position (e.g. routing area), i.e. inter-PLMN-handover as well as intra-PLMN-handover.

FIG. 6 shows as an example a more specific table which is based on the above 3-level-hierarchie used to define decisions of the HSS in case of a change of the position- or network-related information.

After the HSS has decided which position- or network-related information is to be forwarded to the S-CSCF of the IMS core network, a push profile request (PPR) message may be sent to the S-CSCF via the Cx interface in line with the 3-GPP specification TS29.229, and the position- or network-related information is inserted or added to this message. Accordingly, this message is enhanced by corresponding AVP(s). Additionally, a time stamp which indicates the time of transmission may be transmitted in a new AVP together with the changed network- or position-related information, to indicate the time at which the HSS has received the changed position- or network-related information. Thus, the Cx interface is enhanced by at least one specific AVP. As an example, the Cx-PPR message could be enhanced by at least one AVP which contains position- or network-related information. The specific contents depend on the kind of access network (e.g. GPRS/UMTS, WLAN, etc.), and thus also the specific AVP (s).

FIG. 7 shows a table indicating mapping of the position- or network-related information to the RADIUS interface and the Cx interface. Again, the second column shows by which attributes of the Gi/RADIUS interface the (changed) position- or network-related information is transferred. A new AVP for the Cx-PPR message is allocated to each attribute of the second column. Optionally, an AVP for the time stamp may be added.

This time stamp may be formatted according to the time definition in the Internet Engineering Task Force (IETF) specification RFC4330.

Figure 9:
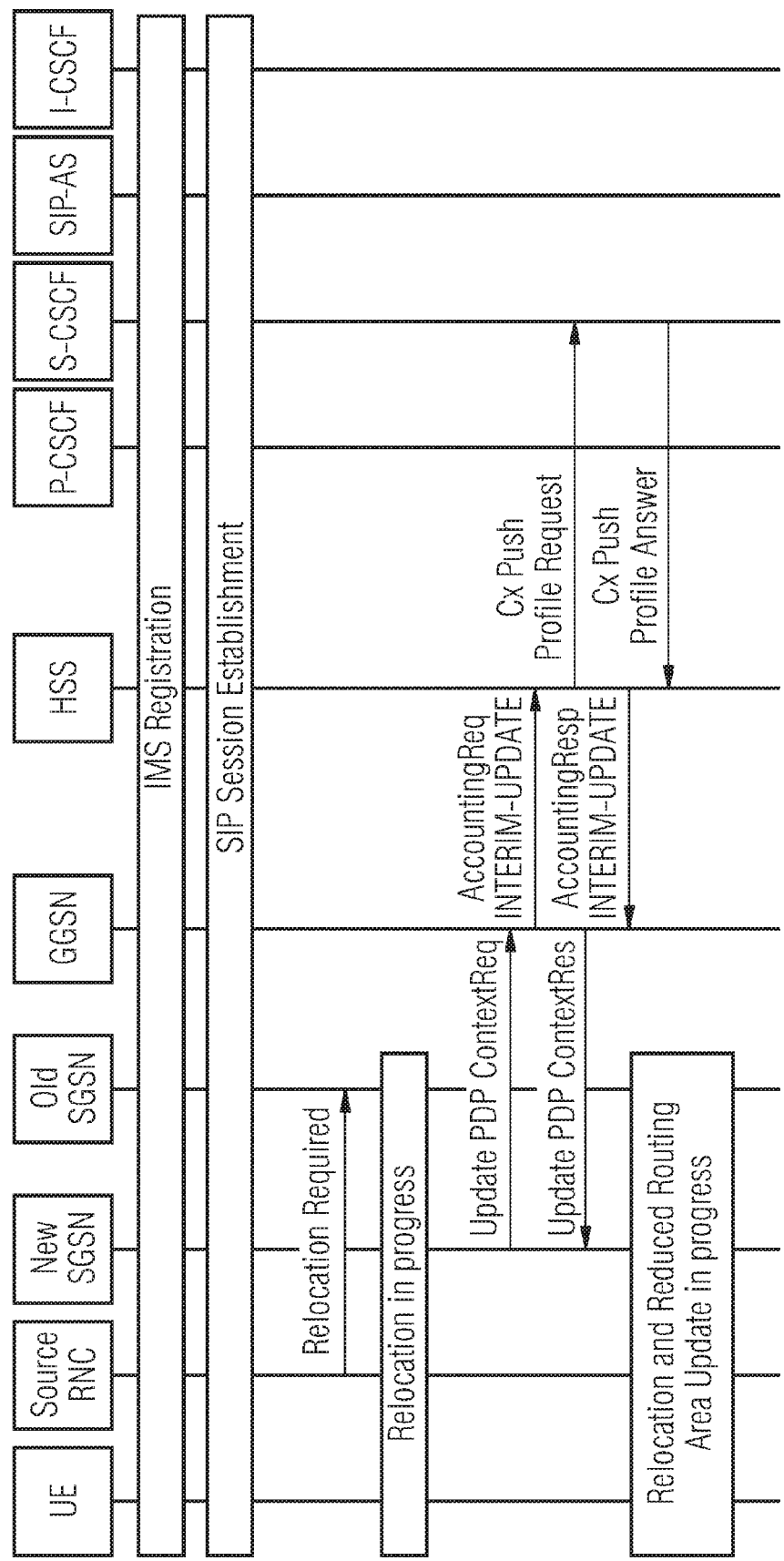
FIG. 9 shows a schematic signaling and processing diagram of a relocation procedure according to an embodiment.

FIGS. 8 and 9 show respective signaling and processing diagrams for message exchange in connection with forwarding of the position- or network-related information from the HSS to the S-CSCF. After initial IMS registration and setup of a SIP session, a routing area update request is send from the terminal device (e.g. UE) of the subscriber to a new SGSN in case of the routing area update procedure of FIG. 8. Then, further messages are exchanged (denoted as "routing area update in progress"). After that message exchange, the new SGSN sends an update PDP context request to the GGSN which according to the present embodiment sends an accounting request interim update to the HSS in response to the receipt of the update PDP context request. If the HSS decides to forward the received position- or network-related information, it sends a Cx push profile request to the S-CSCF of the IMS core network. Then, corresponding responses or answers to the initial requests are sent back. The message flow for the routing area update process is continued.

In case of the RNC relocation of FIG. 9, a relocation request is send from a source RNC to the old SGSN after initial IMS registration and session setup or establishment. This relocation request (e.g. Relocation Required) is followed by a further message exchange (denoted as "relocation in progress"). After that message exchange an update PDP context request is sent from the new SGSN to the GGSN which is triggered according to the present embodiment to send an accounting request interim update to the HSS. Based on the decision at the HSS, a Cx push profile request is optionally send to the S-CSCF. Again respective responses or answers are fed back.

Thus, as can be gathered from the procedures of FIGS. 8 and 9, the subscriber database (e.g. HSS) has a coupling or mapping function between the access network and the core network, for forwarding position- or network-related information from the access network to the core network.

In the following, step S105 of FIG. 1 will be described in more detail based on the example of the present embodiment. After registration of the subscriber the S-CSCF sends so-called third party register requests to application servers connected via an ISC interface, if such are configured in the user profile of the concerned subscriber. This procedure may correspond to the 3GPP specification TS24.229. The S-CSCF inserts or adds to these requests the position- or network-related information received from the HSS in connection with the registration of the subscriber. If the subscriber sends or receives a stand-alone SIP request (i.e. a SIP request which does not belong to a SIP dialogue and which does not initiate a SIP dialogue, for example, a SIP MESSAGE) the position- or network-related information of the S-CSCF are inserted or added to the SIP request or SIP response, so that all network elements on the downstream or upstream communication path are informed.

It is also possible to distribute the position- or network-related information only in one direction (i.e. downstream or upstream) in dependence on the direction of the requests. This distribution may be always performed, regardless of the fact that the information contained in the SIP registration has meanwhile been changed or not. The added information may be removed again, when the corresponding SIP message leaves a trusted domain, e.g. by the last IMS element (relative to the message flow) in the trusted domain. The trusted domain comprises all network elements which are allowed to exchange reliable data according to the definition of the network operator or legal authorities. These are normally all network elements under a unique management.

If the subscriber sends or receives a SIP request which initiates a dialogue (e.g. INVITE, SUBSCRIBE, or REFER message in a defined situation), the position or network-related information is added or inserted into to the SIP request and the SIP response(s) by the S-CSCF, so that all network elements on the downstream and/or upstream side of the data path are informed. As above, it is also possible that the position- or network-related information is distributed only in one direction (i.e. downstream or upstream), in dependence on the direction of the requests. This distribution may always be carried out, regardless of whether the information received with the SIP registration has meanwhile been changed or not. The information may be removed again, if the corresponding SIP message leaves the trusted domain, which may be done by the "last" IMS element (relative to the message flow) in the trusted domain.

If position- or network-related information for a subscriber is transmitted to the S-CSCF and the subscriber is currently involved in one or more SIP dialogues, then a selection or all IMS network elements located at the dialogue path and within the trusted domain are informed. A particular example for this procedure may be sending a SIP INFO, a SIP MESSAGE, a SIP NOTIFY or a newly defined proprietary SIP message to those IMS network nodes which are to be informed. However, as the transmission must be performed outside the SIP signaling of the currently active SIP session (otherwise the counting of SIP messages by means of the so-called sequence numbers will be confused), the SIP call identification of the corresponding SIP dialogue may be added in addition to the position- or network-related information. For each SIP dialogue, an own notification must be initiated, as the involved IMS network nodes may differ each time.

There are different opportunities for deciding which IMS network elements are to be notified. The S-CSCF could send the message to all network elements contained in the route set of the dialogue (and in the trusted domain). The route set contains all network elements through which each message of the dialogue must be routed (as for example defined in the IETF specification RFC3261). As another option, interested network elements could subscribe to the notification of the position- or network-related information by using a special event package at the S-CSCF (as defined for example in the IETF specification RFC3265). As a further option, it may be preconfigured which network elements are to be notified.

As an alternative, the S-CSCF could send the SIP message subsequently or individually to each IMS network element or via a route predefined in the SIP message. In the latter case the message would be forwarded along the given route from one network element to the next.

The position- or network-related information, time stamp and call identification could be conveyed in the body of the SIP message or for example in proprietary P-headers.

FIG. 10 shows a table indicating a possible mapping for the GPRS/UMTS access network. In particular, roaming information and other type of position- or network-related information is indicated in the first column, and a corresponding AVP of the Cx interface is indicated in the second column. The AVP(s) in the second column are mapped to active SIP P-headers as indicated in the third column.

According to an aspect of the embodiment, the S-CSCF can make available position- or network-related information received from HSS, e.g., in the Cx-SAA and/or the Cx-PPR message, to other network elements accessible via SIP by SIP means. This is, however, not limiting, as the above described information could as well be transmitted to other IMS network elements based on another transmission protocol.

In the following, some exemplary actions of the S-CSCF are described once it has received the position- or network-related information.

In step S106a of FIG. 1 concerns actions of the S-CSCF and other IMS or external network nodes in connection with offline charging. To achieve this, the S-CSCF and other network nodes generate CDRs. These can be enhanced by incorporating corresponding data e.g. into the CDR field Record Extension or another suitable field.

FIG. 11 shows an exemplary enhancement of the Record Extension field of the CDR. As can be gathered from FIG. 11, a list of location information comprises the network- or position-related information is added to this field.

Furthermore, step S106b of FIG. 1 relates to actions of the S-CSCF and other IMS or external network nodes in connection with online charging. If the S-CSCF receives a Cx-SAA with a position- or network-related information, a CCR Initial is sent to the OCS, wherein the position- or network-related information is entered into the AVPs, and wherein the following mapping can be applied.

FIG. 12 shows a table indicating a mapping between PS-information AVP and the AVP of the Cx interface in connection with online charging. If a push profile request is received at the S-CSCF via the Cx interface in case of session charging, a CCR update containing the position- or network-related data in the AVP PS-information is sent to the OCS.

Figure 13:
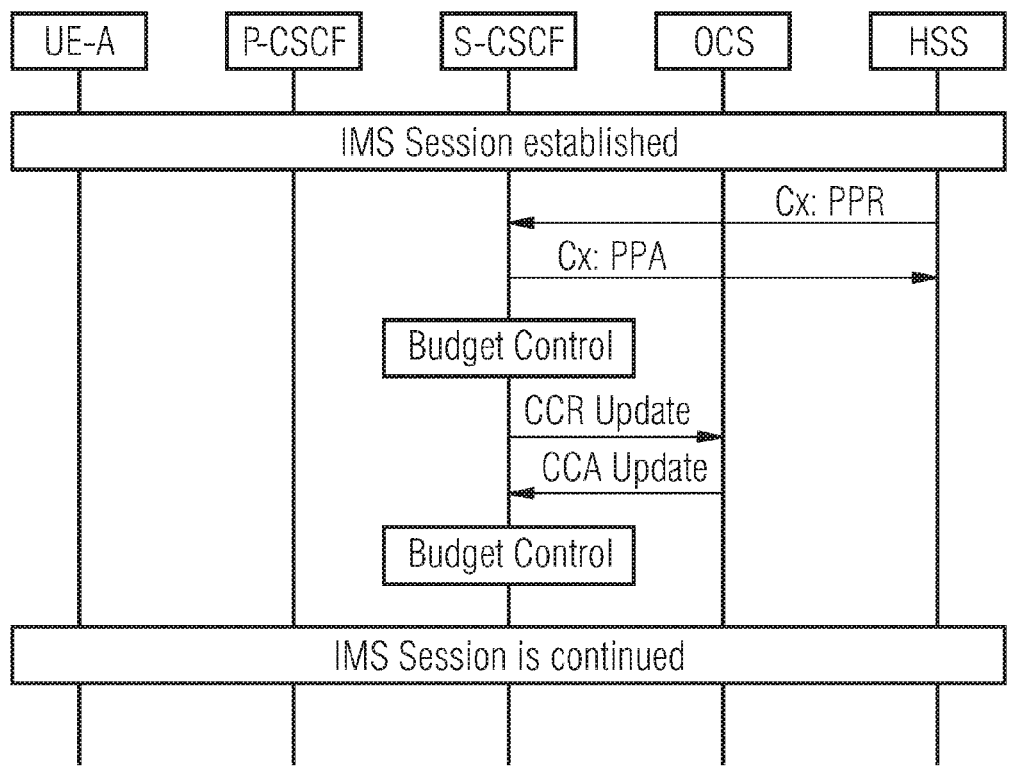
FIG. 13 shows a signaling and processing diagram of an online charging message flow according to an embodiment.

FIG. 13 shows a signaling and processing diagram of such an online charging message flow. After the IMS session is established, the HSS sends a Cx:PPR to the S-CSCF which responds with a Cx:PPA. The Cx:PPR contains the position or network-related information. A budget control process is running all the time the SIP session is active. At the time of receiving a Cx:PPR, the S-CSCF recognizes a change of the position or the network-related information. Then, the budget control process determines the used units (e.g. time units). These used units are included in a CCR Update issued by the S-CSCF containing the position- or network-related information in its AVP PS-information. This CCR Update is acknowledged by a CCA Update from the OCS. The CCA Update contains new granted units according to the position or network-related information. Then, the IMS session is continued.

In the above step S106c of FIG. 1, actions of the S-CSCF or other network nodes in connection with interception are performed. To achieve this, the S-CSCF writes tickets for interception, as specified for example in 3-GPP specifications TS33.107 and TS33.108. These tickets are transmitted via the X2 interface and the delivery function DF2. The ASN.1 code for transmitting the position or network-related information could be implemented as in the following example:

```
LocationInformation ::= SEQUENCE
{
    sGSNIPAddress          [1] IPAddress,
    sGSNMCCMNC             [2] MNCMCCType,
    radioAccessTechnology  [3] RadioAccessTechnology,
    locationInformatin     [4] LITID,
    timeStamp              [6] TimeStamp,
    eventDateTime          [7] EventDateTime
}
```

Finally, step S106d of FIG. 1, which deals with actions of SIP application servers in connection with location dependent services could be implemented as follows. It may be left up to the SIP application server, for which specific purpose the position- or network-related information is used. It could be the transmission of traffic or congestion information by instant messages, location dependent or local advertisements (e.g. restaurants) and/or an enhancement of the presence services, which uses position information e.g. for kids tracking or to inform friends when the concerned subscriber is in the vicinity.

Accordingly, position- and network-related information is made available or usable for charging, interception and location dependent services. This can be achieved by forwarding the position- or network-related information from the access network to the HSS, e.g., by arming specific trigger points and specific configurations. More specifically, the interface to the access network (e.g. Gi interface) is associated with the interface to the core network (e.g. Cx interface), so that position- or network-related information can be transmitted to the serving network element of the core network (e.g. the S-CSCF) upon registration of the subscriber (e.g. by using Cx-SAA) and/or upon a positional change of the subscriber (e.g. by using Cx-PPR).

Figure 14:
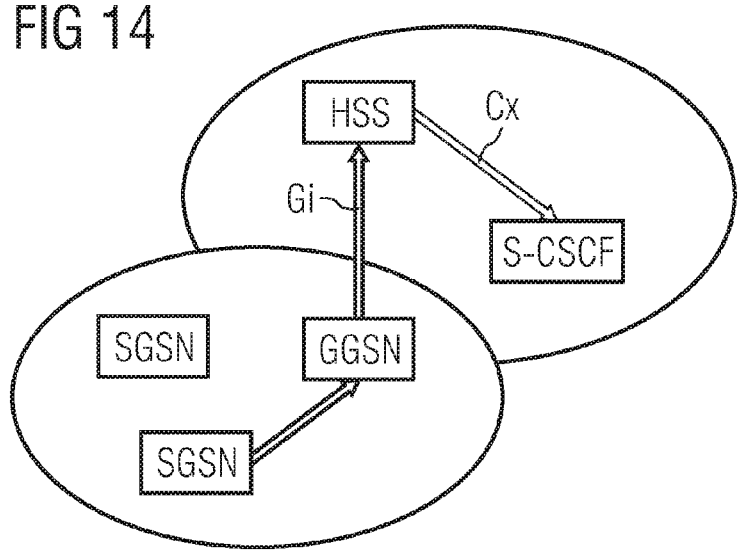
FIG. 14 shows a network architecture with an indication of an information flow in connection with context activation and registration according to an embodiment.

In the following, some specific implementation examples are described with reference to FIGS. 14 to 16.

According to a first example, a subscriber is registered via a GPRS/UMTS access network to the IMS. In FIG. 14, the flow of the position- or network-related information (e.g. roaming information) is shown. The position- or network-related information arrives at the S-CSCF and is distributed from there in the course of the IMS registration and/or third party registration to other IMS network elements. All these network nodes add or insert this information to CDRs or online charging requests. In addition, the information may as well be added to interception tickets. When the subscriber establishes a SIP session, the position- or network-related information which is received at the S-CSCF can be distributed from there to other IMS network elements in connection with the SIP session.

Figures 15, 16:
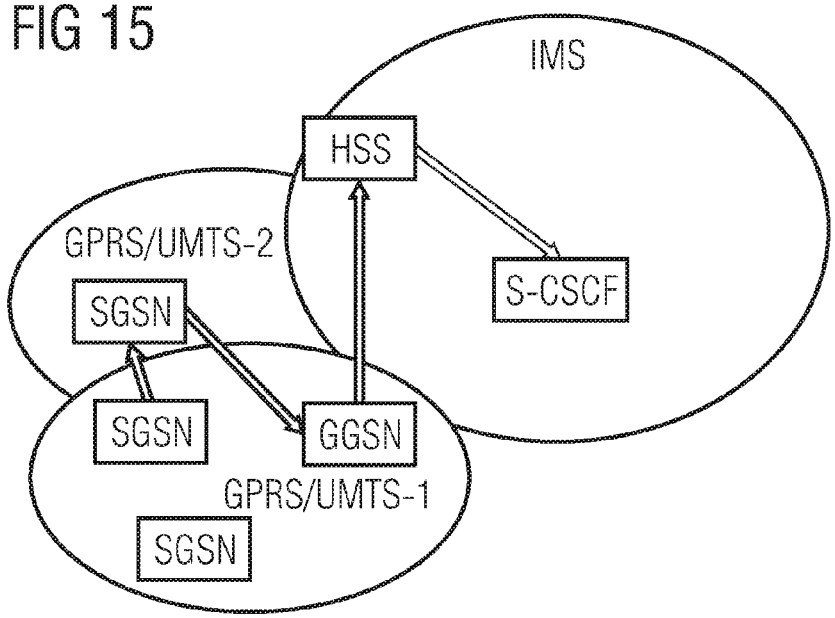
FIG. 15 shows a network architecture with an indication of an information flow in connection with inter access network handover according to an embodiment.
FIG. 16 shows an enhancement of a record extension field in a charging data record according to an embodiment.

FIG. 15 shows a schematic network environment and information flow in connection with an inter PLMN (Public Land Mobile Network) handover according a second example. In this example, contrary to the first example, the network is changed during the roaming procedure. The first initial SGSN is part of a first access network GPRS/UMTS-1, while the second SGSN after handover belongs to a second access network GPRS/UMTS-2. Here, the information is transmitted from the new SGSN to the GGSN of the first access network and from there to the HSS in a manner described above. The HSS forwards the position- or network-related information to the S-CSCF of the IMS.

FIG. 16 shows an example of a table indicating an enhancement of the Record Extension field in the CDRS. In case of the inter PLMN handover, a longer list of location information is required, as two different SGSNs have to be specified. In case of the first example, the list of location information would only comprise the first five elements of this list, which relate to the first access network.

According to a third example, a subscriber is to be intercepted, which is registered in a GPRS/UMTS access network of a foreign country. The operator of the foreign GPRS/UMTS network is not aware that the subscriber shall be intercepted, so that no information can be expected from him. By using the proposed procedure according to the above embodiments, the required position- or network-related information can be transferred to the IMS and can be written into the interception ticket. Based on the location information, the SGSN identification, the MCC/MNC and the time stamp, the position of the subscriber can be specially limited.

Figure 17:
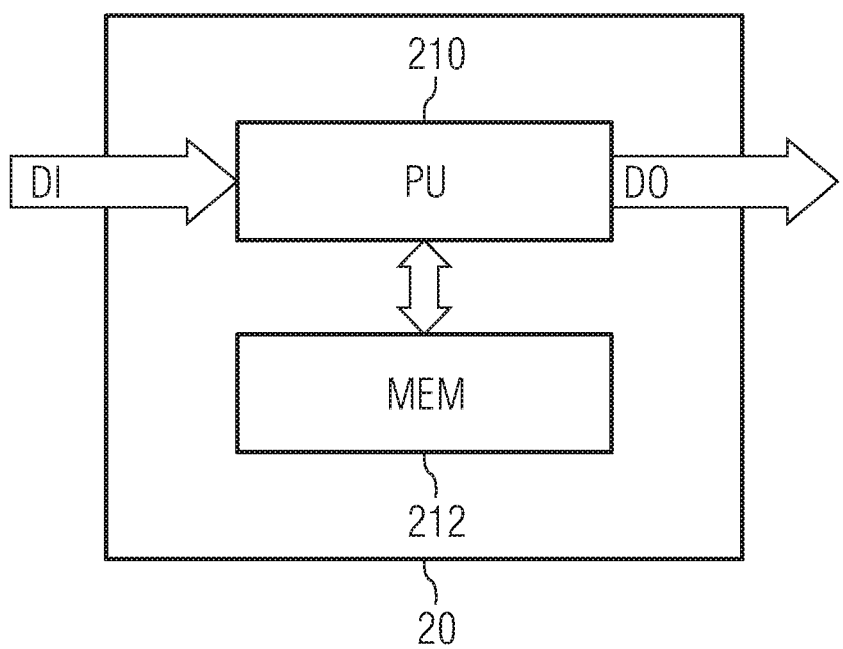
FIG. 17 shows a schematic block diagram of a software based implementation according to an embodiment.

FIG. 17 shows a schematic block diagram of a software-based implementation of the proposed information forwarding system. Here, the proposed subscriber database comprises a processing unit 210, which may be any processor or computer device with a control unit which performs control based on software routines of a control program stored in a memory 212. Program code instructions are fetched from the memory 212 and are loaded to the control unit of the processing unit 210 in order to perform the processing steps of the above functionalities described in connection with FIG. 1.

These processing steps may be performed on the basis of input data DI and may generate output data DO, wherein the input data DI may correspond to the predetermined notification received from the access network and the output data DO may correspond to message or signalling with the position- or network-related information to be forwarded to the serving network element of the core network.

To summarize, a method, subscriber database, network element, an interface and a computer program product for distributing position- or network-related information from an access network to a core network are described, wherein a first interface between the access network and the subscriber database is associated with a second interface between the core network and the subscriber database in a manner so that, in response to at least one predetermined notification indicating a registration or change of position and signaled to the subscriber database via the first interface, the position- or network-related information is selectively signaled via the second interface to a serving network element of the core network in a server assignment answer or in a push profile request. Thereby, position or location information of a subscriber or user in an access network is directly or automatically availability in the core network.

It is to be noted that the present invention is not restricted to the embodiments described above, but can be implemented in any network environment comprising a subscriber database with interfaces to an access network and a core network. Any signaling format or means can be used for receiving and transmitting the position- or network-related information. The embodiments may thus vary within the scope of the attached claims.

The invention claimed is:

1. A method of distributing position- or network-related information from an access network to a core network, wherein a first interface provided between said access network and a subscriber database is associated with a second interface provided between said core network and said subscriber database in a manner so that, in response to at least one predetermined notification which indicates a registration or change of position and which is signaled to said subscriber database via said first interface, said position- or network-related information is selectively signaled via said second interface to a network element of said core network in a server assignment answer or in a push profile request.

2. The method according to claim 1, wherein said position- or network-related information comprises at least one of an identification of said access network, a network address of a serving node of a concerned subscriber in said access network, an access technology used by said concerned subscriber in said access network, and a location information of a terminal device used by said concerned subscriber.

3. The method according to claim 2, wherein said identification of said access network is signaled by at least one of a mobile country code and a mobile network code, said access technology is signaled by a radio access type parameter, and said location information is signaled by at least one of cell global identification and a service area identity.

4. The method according to claim 1, wherein said access network is a cellular network and said core network is a multimedia subsystem.

5. The method according to claim 1, wherein said subscriber database is a home subscriber server.

6. The method according to claim 1, wherein said access network is a network of the General Packet Radio Services type or the Universal Mobile Communications System type, and wherein said first interface is a Gi interface and said second interface is Cx interface.

7. The method according to claim 6, wherein said push profile request is a Push-Profile-Request message, and wherein said server assignment answer is a Server-Assignment-Answer message.

8. The method according to claim 1, wherein said position- or network-related information is signaled as an attribute value pair.

9. The method according to claim 1, wherein said position- or network-related information is added by said network element to at least one of a charging data record, an account request, a credit control request, and an interception ticket.

10. The method according to claim 1, wherein said predetermined notification comprises at least one of an accounting request, an accounting request update, and an update context request.

11. The method according to claim 1, wherein said predetermined notification is evaluated and a predetermined further action is selected at said subscriber database.

12. The method according to claim 11, wherein the evaluation is based on a comparison with a stored previous value of said position- or network-related information, and on a determination whether said access network belongs to the same operator as said core network, or not, if the value of said position- or network-related information has changed.

13. The method according to claim 12, wherein the selection is based on a hierarchical structure comprising at least two of a first level in which said position- or network-related information is not signaled to said network element, a second level in which said position- or network-related information is signaled to said network element if said access network has changed or if the concerned subscriber is registered in a network which does not belong to the operator of said core network, and a third level in which said position- or network-related information is always signaled to said network element.

14. The method according to claim 1, wherein a time information indicating the time of receipt of said predetermined notification is signaled to said network element together with said position- or network-related information.

15. The method according to claim 1, wherein if said predetermined notification indicates a user registration, said position- or network-related information is added at said network element to a request for registering a third party and sent to at least one application server configured in a user profile and connected to said core network.

16. The method according to claim 1, wherein if a user to which said predetermined notification relates transmits or receives a message to/from said core network, said position- or network-related information is added at said network element to said message.

17. The method according to claim 16, wherein said added position- or network-related information is deleted when said message leaves a predetermined reliable network domain.

18. The method according to claim 1, wherein if a user to which said predetermined notification relates is involved in at least one dialogue, said position- or network-related information and an identification of said dialogue are added at said network element to a message and sent to at least a selection of network elements located on a path of said dialogue.

19. The method according to claim 18, wherein said selection is determined from at least one of a route set of said dialogue, an event package to which interested network elements are subscribed, and a pre-configuration.

20. The method according to claim 18, wherein a time stamp is added to said message.

21. A non-transitory computer readable medium encoded with instructions that, when run on a computing device, perform a process, the process comprising the steps of method claim 1.

22. A subscriber database for storing subscriber-related data of an access network, said network device comprising a first interface to said access network and a second interface to a core network, wherein said subscriber database is configured to selectively signal position- or network-related information via said second interface to a network element of said core network in a server assignment answer or in a push profile request, in response to a receipt of a predetermined notification indicating a registration or change of position via said first interface.

23. The subscriber database according to claim 22, wherein said access network is a cellular network and said core network is a multimedia subsystem.

24. A network system comprising a subscriber database according to claim 23 and a network element configured to serve subscribers in a core network, said network element having an interface for connection to a subscriber database of an access network, said network element being configured to receive position- or network-related information via said interface in a server assignment answer or in a push profile request, and to distribute said received position- or network-related information in or from said core network.

25. The subscriber database according to claim 22, wherein said subscriber database is a home subscriber server.

26. The subscriber database according to claim 22, wherein said access network is a network of the General Packet Radio Services type or the Universal Mobile Communications System type, and wherein said first interface is a Gi reference point and said second interface is Cx interface.

27. The subscriber database according to claim 26, wherein said push profile request is a Push-Profile-Request message.

28. The subscriber database according to claim 22, wherein said subscriber data base is configured to signal said position- or network-related information as an attribute value pair.

29. The subscriber database according to claim 22, wherein said predetermined notification comprises at least one of an accounting request, an accounting request update, and an update context request.

30. The subscriber database according to claim 22, wherein said subscriber database is configured to evaluate said predetermined notification and to select a predetermined further action.

31. The subscriber database according to claim 30, wherein said subscriber database is configured to perform the evaluation based on a comparison with a stored previous value of said position- or network-related information, and on a determination whether said access network belongs to the same operator as said core network, or not, if the value of said position- or network-related information has changed.

32. The subscriber database according to claim 31, wherein said subscriber database is configured to base the selection on a hierarchical structure comprising at least two of a first level in which said position- or network-related information is not signaled to said network element, a second level in which said position- or network-related information is signaled to said network element if said access network has changed or if the concerned subscriber is registered in a network which does not belong to the operator of said core network, and a third level in which said position- or network-related information is always signaled to said network element.

33. The subscriber database according to claim 22, wherein said subscriber database is configured to signal a time information indicating the time of receipt of said predetermined notification to said network element together with said position- or network-related information.

34. A network element configured to serve subscribers in a core network and having an interface for connection to a subscriber database of an access network, said network element being configured to receive position- or network-related information via said interface in a server assignment answer or in a push profile request, and to distribute said received position- or network-related information in or from said core network,
  wherein if a user to which said predetermined notification relates is involved in at least one dialogue, said network element is configured to add said position- or network-related information and an identification of said dialogue to a message and sent it to at least a selection of network elements located on a path of said dialogue, and
  wherein said network element is configured to determine said selection from at least one of a route set of said dialogue, an event package to which interested network elements are subscribed, and a pre-configuration.

35. A network element configured to serve subscribers in a core network and having an interface for connection to a subscriber database of an access network, said network element being configured
  to receive position- or network-related information via said interface in a server assignment answer or in a push profile request, and
  to distribute said received position- or network-related information in or from said core network,
  wherein if a user to which said predetermined notification relates is involved in at least one dialogue, said network element is configured to add said position- or network-related information and an identification of said dialogue to a message and sent it to at least a selection of network elements located on a path of said dialogue,
  wherein said network element is configured to add a time stamp to said message.

* * * * *